(12) United States Patent
Kennard

(10) Patent No.: US 9,350,437 B2
(45) Date of Patent: *May 24, 2016

(54) SYSTEMS AND METHODS FOR SIGNAL FREQUENCY DIVISION IN WIRELESS COMMUNICATION SYSTEMS

(71) Applicant: Aviat U.S., Inc., Santa Clara, CA (US)

(72) Inventor: Paul A. Kennard, San Jose, CA (US)

(73) Assignee: Aviat U.S., Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/639,328

(22) Filed: Mar. 5, 2015

(65) Prior Publication Data

US 2015/0180564 A1    Jun. 25, 2015

Related U.S. Application Data

(63) Continuation of application No. 13/654,294, filed on Oct. 17, 2012, now Pat. No. 9,008,162.

(60) Provisional application No. 61/548,063, filed on Oct. 17, 2011.

(51) Int. Cl.
*H04B 7/02* (2006.01)
*H04B 7/08* (2006.01)
(Continued)

(52) U.S. Cl.
CPC ............ *H04B 7/0805* (2013.01); *H04B 7/0613* (2013.01); *H04B 7/0817* (2013.01); *H04B 7/10* (2013.01); *H04W 88/085* (2013.01)

(58) Field of Classification Search
CPC ...... H04B 7/0613; H04B 7/0817; H04B 7/10; H04B 7/0805; H04B 10/532; H04B 10/614; H04B 10/6151; H04B 14/008
USPC ................ 375/219, 220, 222, 295, 316, 259, 267,375/299, 347, 349
See application file for complete search history.

(56) References Cited

U.S. PATENT DOCUMENTS

| 4,847,574 A | 7/1989 | Gautier et al. |
| 4,965,809 A * | 10/1990 | Endo ................... H04B 7/18513 342/353 |

(Continued)

FOREIGN PATENT DOCUMENTS

| CN | 101694156 | 4/2010 |
| EP | 0685973 | 12/1995 |

(Continued)

OTHER PUBLICATIONS

International Application No. PCT/US2012/035010, International Search Report and Written Opinion mailed Aug. 16, 2012.

(Continued)

*Primary Examiner* — Siu Lee
(74) *Attorney, Agent, or Firm* — Sheppard, Mullin, Richter & Hampton LLP

(57) ABSTRACT

A system may include at least one antenna for receiving a first receive signal having a first signal diversity property and a second receive signal having a second signal diversity property. A first signal path may include a first frequency converter for downconverting the first receive signal to a first intermediate frequency signal having a first intermediate frequency. A second signal path may include a second frequency converter for downconverting the second receive signal to a second intermediate frequency signal having a second intermediate frequency. A transducer module may route the first receive signal to the first signal path, and route the second receive signal to the second signal path. A first N-plexer may select the first intermediate frequency signal or the second intermediate frequency signal for transmission to a cable, and to provide a data signal based on a selected intermediate frequency signal to the cable.

23 Claims, 8 Drawing Sheets

(51) Int. Cl.
*H04B 7/06* (2006.01)
*H04B 7/10* (2006.01)
*H04W 88/08* (2009.01)

(56) References Cited

U.S. PATENT DOCUMENTS

| | | | |
|---|---|---|---|
| 5,422,913 A | 6/1995 | Wilkinson | |
| 5,485,485 A | 1/1996 | Briskman et al. | |
| 6,185,258 B1 | 2/2001 | Alamouti et al. | |
| 6,704,579 B2 * | 3/2004 | Woodhead | H04W 52/24 455/522 |
| 6,879,627 B1 | 4/2005 | Davidson et al. | |
| 7,050,765 B2 | 5/2006 | Ammar et al. | |
| 7,133,082 B2 | 11/2006 | Limberg | |
| 7,236,807 B1 | 6/2007 | Shapira et al. | |
| 7,246,005 B2 | 7/2007 | Johnson | |
| 7,379,717 B1 | 5/2008 | Haab et al. | |
| 7,769,347 B2 | 8/2010 | Louberg et al. | |
| 7,792,494 B2 | 9/2010 | Shen et al. | |
| RE42,225 E | 3/2011 | Stanwood et al. | |
| 7,912,506 B2 | 3/2011 | Lovberg et al. | |
| 8,842,788 B2 | 9/2014 | Kennard et al. | |
| 9,008,162 B2 * | 4/2015 | Kennard | H04B 7/0613 375/219 |
| 2002/0128043 A1 * | 9/2002 | Chandler | H04W 24/00 455/561 |
| 2004/0067739 A1 | 4/2004 | Sim et al. | |
| 2005/0255888 A1 | 11/2005 | Cooper et al. | |
| 2006/0030279 A1 | 2/2006 | Leabman | |
| 2006/0052065 A1 | 3/2006 | Argaman et al. | |
| 2006/0097940 A1 | 5/2006 | Shimawaki et al. | |
| 2007/0030336 A1 * | 2/2007 | Hoshigami | H04B 17/309 348/14.01 |
| 2007/0116162 A1 | 5/2007 | Eliaz et al. | |
| 2007/0189154 A1 | 8/2007 | Hourtane et al. | |
| 2007/0237242 A1 | 10/2007 | Gjertsen | |
| 2007/0279408 A1 * | 12/2007 | Zheng | G09G 5/006 345/213 |
| 2008/0242239 A1 | 10/2008 | Wilson et al. | |
| 2008/0303528 A1 | 12/2008 | Kim | |
| 2009/0154621 A1 | 6/2009 | Shapira et al. | |
| 2010/0069009 A1 | 3/2010 | Bloebaum et al. | |
| 2010/0087227 A1 | 4/2010 | Francos et al. | |
| 2010/0093282 A1 | 4/2010 | Martikkala et al. | |
| 2010/0207834 A1 | 8/2010 | Wahlberg et al. | |
| 2011/0053536 A1 | 3/2011 | Friedmann | |
| 2011/0109520 A1 | 5/2011 | Buer et al. | |
| 2011/0134972 A1 | 6/2011 | Zhu et al. | |
| 2011/0235572 A1 | 9/2011 | Lorg et al. | |
| 2012/0093100 A1 * | 4/2012 | Qin | H04B 7/10 370/329 |
| 2012/0100887 A1 | 4/2012 | Tekin et al. | |
| 2012/0270507 A1 | 10/2012 | Qin et al. | |

FOREIGN PATENT DOCUMENTS

| | | |
|---|---|---|
| WO | 9748191 | 12/1997 |
| WO | 2008076432 | 6/2008 |
| WO | 2009143176 | 11/2009 |

OTHER PUBLICATIONS

International Application No. PCT/US2012/060656, International Search Report and Written Opinion mailed Mar. 13, 2013.
International Application No. PCT/US2013/021321, International Search Report and Written Opinion mailed Mar. 25, 2013.
International Application No. PCT/US2013/026755, International Search Report and Written Opinion mailed Jun. 5, 2013.
European Patent Application No. 12841752.4, Search Report mailed Jun. 11, 2015.
European Patent Application No. 13735574.9, Search Report mailed Mar. 9, 2016.

\* cited by examiner

SYSTEMS AND METHODS FOR SIGNAL FREQUENCY DIVISION IN WIRELESS COMMUNICATION SYSTEMS

CROSS-REFERENCE TO RELATED APPLICATIONS

The present application is a continuation and claims the benefit of U.S. Non-Provisional patent application Ser. No. 13/654,294, filed Oct. 17, 2012 and entitled "Systems and Methods for Signal Frequency Division in Wireless Communication Systems," which claims priority to U.S. Provisional Patent Application Ser. No. 61/548,063, filed Oct. 17, 2011 and entitled "Combination of Main, Diversity and Cross Polar Signals on One Coax Cable," which are incorporated by reference herein.

BACKGROUND

1. Technical Field

The present invention(s) generally relate to combining signals across a cable between units of a wireless communication system. More particularly, the invention(s) relate to systems and methods for signal frequency division in wireless communication systems.

2. Description of Related Art

In split mount microwave radio systems, a transceiver may include an indoor unit (IDU) and an outdoor unit (ODU) coupled to an antenna. In one example, the IDU may be coupled to a server or other computer over a wired network (e.g., LAN, WAN, or the Internet) or to a mobile network base station. Information to be wirelessly transmitted may be prepared by both the IDU and the ODU before wireless transmission. Similarly, the ODU may receive signals from the antenna to provide to the server, other computer, or mobile network node via the IDU.

When multiple transmit signals are to be transmitted or multiple receive signals are to be received, two different ODUs may be used. Each different ODU may be coupled to one or more IDUs with at least two cables to provide the signals. Unfortunately, multiple cables between one or more ODUs and one or more IDUs may increase cost and require additional parts.

SUMMARY

A system may include at least one antenna for receiving a first receive signal having a first signal diversity property and a second receive signal having a second signal diversity property. A first signal path may include a first frequency converter for downconverting the first receive signal to a first intermediate frequency signal having a first intermediate frequency. A second signal path may include a second frequency converter for downconverting the second receive signal to a second intermediate frequency signal having a second intermediate frequency. A transducer module may route the first receive signal to the first signal path, and route the second receive signal to the second signal path. A first N-plexer may select the first intermediate frequency signal or the second intermediate frequency signal for transmission to a cable, and to provide a data signal based on a selected intermediate frequency signal to the cable.

In some embodiments, the first signal diversity property comprises a first spatial property, and the second signal diversity property comprises a second spatial property, the second spatial property being spatially diverse from the first spatial property. In various embodiments, the first signal diversity property comprises a first polarization, and the second signal diversity property comprises a second polarization, the second polarization being orthogonal to the first polarization. The transducer module may be configured to depolarize the first receive signal and the second receive signal.

In some embodiments, the system is incorporated into an Outdoor Unit (ODU) of a split-mount radio system.

The system may further comprise a second N-plexer may be configured to receive the data signal from the cable, to provide the data signal to a third signal path if the selected intermediate signal is the first intermediate frequency signal, and to provide the data signal to a fourth signal path if the selected intermediate signal is the second intermediate frequency signal. A modem may be configured to demodulate the data signal and provide a demodulated data signal. A third frequency converter may be configured to downconvert the demodulated data signal to a baseband signal.

In various embodiments, the second N-plexer, the modem, and the third frequency converter are within an Indoor Unit (IDU) of a split-mount radio. The third frequency converter may be configured to provide the baseband signal to Customer Premises Equipment (CPE).

A system may include a first N-plexer configured to be coupled to a cable, the first N-plexer configured to receive from the cable a first data signal and a second data signal, and to convert the first data signal to a first intermediate frequency signal, and to convert the second data signal to a second intermediate frequency signal. A first signal path may include a first frequency converter configured to upconvert the first intermediate frequency signal to a first transmit signal having a transmit frequency. A second signal path may include a second frequency converter configured to upconvert the second intermediate frequency signal to a second transmit signal having the transmit frequency. A transducer module may be configured to process the first transmit signal and the second transmit signal. At least one antenna may be configured to transmit the first transmit signal using a first signal diversity property, and to transmit the second transmit signal using a second signal diversity property.

In some embodiments, the first signal diversity property comprises a first spatial property, and the second signal diversity property comprises a second spatial property, the second spatial property being spatially diverse from the first spatial property. In various embodiments, the first signal diversity property comprises a first polarization, and the second signal diversity property comprises a second polarization, the second polarization being orthogonal to the first polarization. The transducer module may be configured to polarize the first transmit signal and the second transmit signal.

In some embodiments, the system is incorporated into an Outdoor Unit (ODU) of a split-mount radio system.

A method may include: receiving a first receive signal having a first signal diversity property; receiving a second receive signal having a second signal diversity property; downconverting, in a first signal path, the first receive signal to a first intermediate frequency signal having a first intermediate frequency; downconverting, in a second signal path, the second receive signal to a second intermediate frequency signal having a second intermediate frequency; routing the first receive signal to the first signal path; routing the second receive signal to the second signal path; selecting the first intermediate frequency signal or the second intermediate frequency signal for transmission to a cable; and providing a data signal based on a selected intermediate frequency signal to the cable.

In some embodiments, the first signal diversity property comprises a first spatial property, and the second signal diversity property comprises a second spatial property, the second spatial property being spatially diverse from the first spatial property. In various embodiments, the first signal diversity property comprises a first polarization, and the second signal diversity property comprises a second polarization, the second polarization being orthogonal to the first polarization. The method may further include depolarizing the first receive signal; and depolarizing the second receive signal.

The method may include: providing the first intermediate frequency signal to a third signal path; providing the second intermediate frequency signal to a fourth signal path; demodulating the first intermediate frequency signal and the second intermediate frequency signal to provide a demodulated intermediate frequency signal; and downconverting the demodulated intermediate frequency signal to a baseband signal.

The method may further include providing the baseband signal to Customer Premises Equipment (CPE).

A method may include receiving from a cable a first data signal; receiving from the cable a second data signal; converting the first data signal to a first intermediate frequency signal having a first intermediate frequency; converting the second data signal to a second intermediate frequency signal having a second intermediate frequency; upconverting, in a first signal path, the first intermediate frequency signal to a first transmit signal having a transmit frequency; upconverting, in a second signal path, the second intermediate frequency signal to a second transmit signal having the transmit frequency; using a first transducer module coupled to the first signal path and the second signal path to process the first transmit signal; using the first transducer to process the second transmit signal; using at least one antenna to transmit the first transmit signal using a first signal diversity property; and using the at least one antenna to transmit the second transmit signal using a second signal diversity property.

In some embodiments, the first signal diversity property comprises a first spatial property, and the second signal diversity property comprises a second spatial property, the second spatial property being spatially diverse from the first spatial property. In various embodiments, the first signal diversity property comprises a first polarization, and the second signal diversity property comprises a second polarization, the second polarization being orthogonal to the first polarization.

The method may further include polarizing the first transmit signal; and polarizing the second transmit signal.

BRIEF DESCRIPTION OF THE DRAWINGS

The drawings are provided for purposes of illustration only and merely depict typical or example embodiments. These drawings are provided to facilitate the reader's understanding and shall not be considered limiting of the breadth, scope, or applicability various embodiments.

The figures are not intended to be exhaustive or to limit the embodiments to the precise form disclosed. It should be understood that various embodiments may be practiced with modification and alteration.

DETAILED DESCRIPTION OF THE INVENTION

Some embodiments described herein enable a reduction of signal interconnections between units in wireless communication systems such as microwave systems. In one example, the interconnection may be reduced by one or more cables.

In various embodiments, multiple transmit and/or receive signals may be combined on a single IDU-ODU cable (e.g., a coaxial cable). This process may allow the transmit and receive signals to be dedicated to main and diversity signals in one application and transmit and receive dual polarization signals in another application. In one exemplary implementation of both these applications, the units at each end may include a single modem card and a single ODU.

Various embodiments may allow flexibility to have a single modem, cable, and ODU ensemble for diversity combining in the modem from a set of signals carried on one cable. Mode switching in the modem and ODU may allow transport dual polar signals in the transmit and receive direction on one cable. Exemplary processes may also support transmit MIMO on one cable. In one example, the signals are separated in frequency and may use 126 MHz and 500 MHz for receive signals, and 311 MHz and 700 MHz for transmit signals. This arrangement may be capable of carrying 2 Gbs on one cable connected to one modem and ODU.

Figure 1:
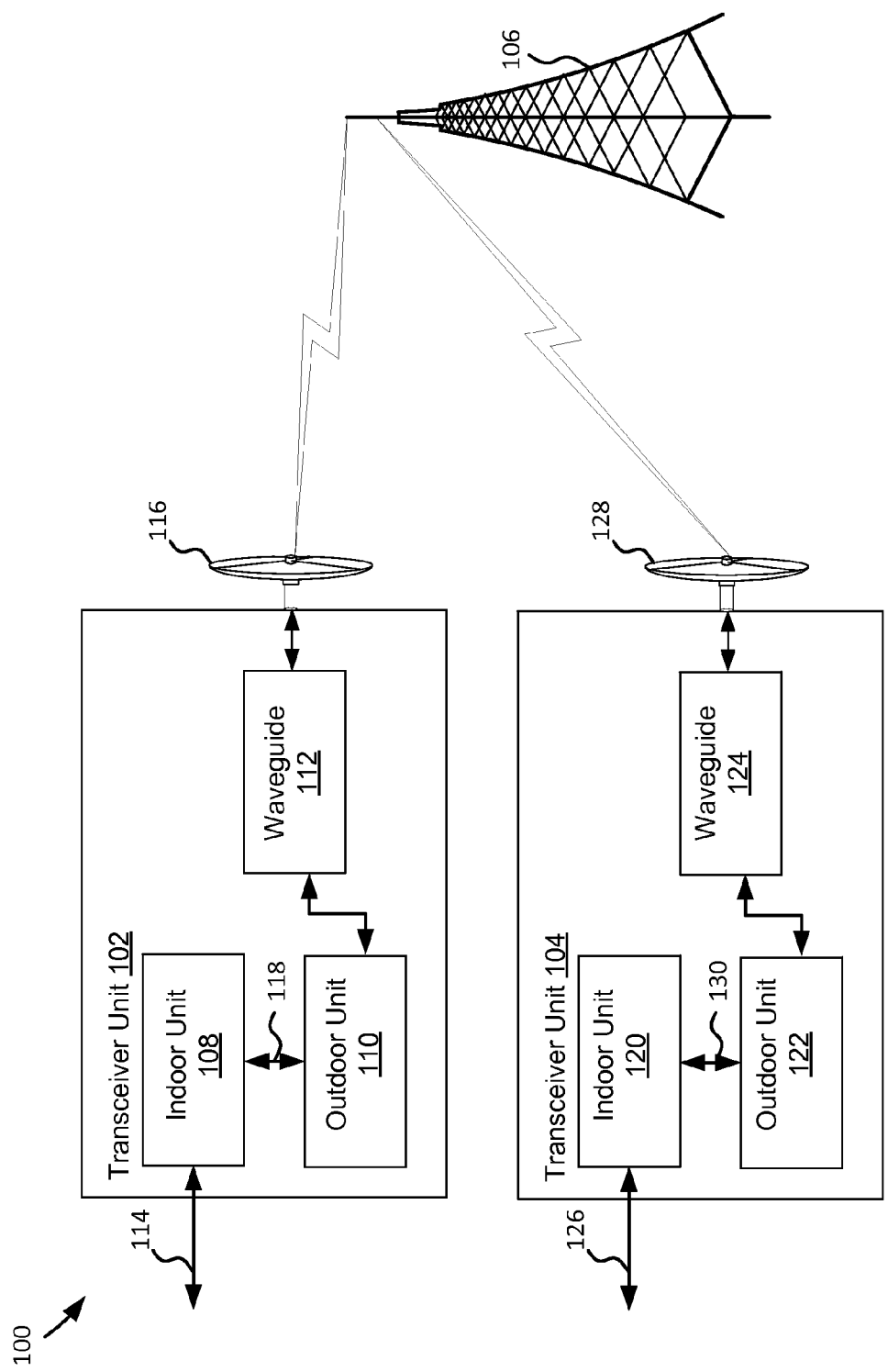
FIG. 1 is an environment including two transceiver units in some embodiments.

FIG. 1 is an environment 100 including two transceiver units 102 and 104 in some embodiments. Each of the transceiver units 102 and 104 are split mount radios. A split-mount radio has a part of the electronics mounted outdoors with an antenna and part indoors. The outdoor unit (ODU) may be the RF transmitter/receiver. In various embodiments, the indoor unit (IDU) contains a data access card (DAC) and a radio access card (RAC). The IDU may contain the modulator/demodulator, multiplexer, control, and traffic interface elements. The IDU and ODU may be coupled together using a cable or any other means.

By comparison, an all-indoor radio has all radio equipment installed inside and is connected to its antenna using a waveguide or coax feeder. A split-mount radio may be a point-to-point radio installation for licensed 5 to 42+ GHz frequency bands with the ODU direct-mounted to the rear of the antenna to provide an integral antenna feed. By having the ODU mounted with the antenna, split-mount may eliminate or reduce feeder losses, minimize or reduce rack occupancy, and/or lower installed costs compared to indoor radios.

For example, transceiver unit 102 may comprise an IDU 108 in communication with a processor and/or a digital device, an ODU 110 in communication with the IDU 108 over cables 118, a waveguide 112 in communication with the ODU 110, and an antenna 116. The IDU 108 may comprise a modulator/demodulator and control circuitry for providing data from a digital device or a processor over line 114 to the antenna 116 via the ODU 110 and/or the waveguide 112. Similarly, the IDU 108 may also be configured to receive information from the antenna 116 via the ODU 110 for providing to the digital device or processor via the line 114. The ODU 110 may comprise an RF transmitter/receiver and be coupled with the antenna 116. The waveguide 112 may or may not be a part of the ODU 110.

The IDU 108 of the transceiver unit 102 may be coupled to the ODU 110 utilizing a coaxial cable 118. Although only one coaxial cable 118 is depicted in FIG. 1, any number of coaxial cables may provide signals between the IDU 108 and the ODU 110. Further, those skilled in the art will appreciate that any number and/or type of cables may be configured to receive and transmit signals between the IDU 108 and the ODU 110.

Similarly, transceiver unit 104 may comprise an IDU 120 in communication with a processor and/or a digital device, an ODU 122 in communication with the IDU 120 over cable 130, a waveguide 124 in communication with the ODU 122, and an antenna 128. The IDU 120 may comprise a modulator/demodulator and control circuitry for providing data from a digital device or a processor over line 126 to the antenna 128 via the ODU 122 and/or the waveguide 124. Similarly, the IDU 120 may also be configured to receive information from the antenna 128 via the ODU 122 for providing to the digital device or processor via the line 126. The ODU 122 may comprise an RF transmitter/receiver and be coupled with the antenna 128. The waveguide 124 may or may not be a part of the ODU 122.

The IDU 120 of the transceiver unit 104 may be coupled to the ODU 122 utilizing a coaxial cable 130. Although only one coaxial cable 130 is depicted in FIG. 1, any number of coaxial cables may provide signals between the IDU 108 and the ODU 110. Further, those skilled in the art will appreciate that any number and/or type of cables may be configured to receive and transmit signals between the IDU 108 and the ODU 110.

Those skilled in the art will appreciate that the transceiver unit 104 may perform in a manner similar to the transceiver 102. In various embodiments, the two transceiver units 102 and 104 may be in communication with each other over a wireless communication tower 106. Those skilled in the art will appreciate that the transceiver units 102 and 104, individually or together, may communicate with any digital device or receiver.

The wireless communication tower 106 (e.g., cell tower or other microwave radio device) may be any device configured to receive and/or transmit wireless information.

Various embodiments may comprise a wireless communication system configured to transmit and receive orthogonally polarized signals or wireless communication systems with antenna spatial diversity. Multiple signals (e.g., multiple transmit and/or multiple receive signals) may be shared between an ODU and an IDU over a single cable utilizing systems and methods described herein. In some embodiments, multiple signals may be shared between an ODU and a modem over a single cable.

In some embodiments, wireless communication systems may utilize polarization diversity on a wireless channel to increase capacity or compensate for fading conditions. Some systems, for example, utilize a horizontally polarized signal and a vertically polarized signal on the same wireless channel to either increase capacity of communication or redundantly communicate data between communications sites when the same wireless channel is experiencing a fading condition. In a polarization diversity system, there may be two transmit signals (e.g., one transmit signal to be transmitted horizontally and one transmit signal to be transmitted vertically) as well as two receive signals (e.g., one receive signal received by the antenna as a horizontally polarized signal and one receive signal received by the same antenna as a vertically polarized signal).

Other wireless systems may utilize antenna spatial division. In these systems, multiple antennas may be utilized to provide redundancy in case of fading signal conditions. In one example, a main antenna may be utilized to receive a main signal and a diversity antenna may be utilized to receive a diversity signal. The diversity signal may be required if the main signal is faded or otherwise contains errors. In these systems, for example, multiple receive signals may be received (e.g., a main signal by the first antenna and a diversity signal by the second antenna) but only a single transmit signal may be transmitted.

In order to communicate multiple receive and/or transmit signals from the ODU to the modem, multiple coaxial cables may be used. In some embodiments, however, a single coaxial cable may be utilized in conjunction with a system of frequency division to maintain the receive and/or transmit signals between the ODU and IDU (or modem). Those skilled in the art will appreciate that any technique may be used to maintain or retain the signals across the single cable.

Figure 2:
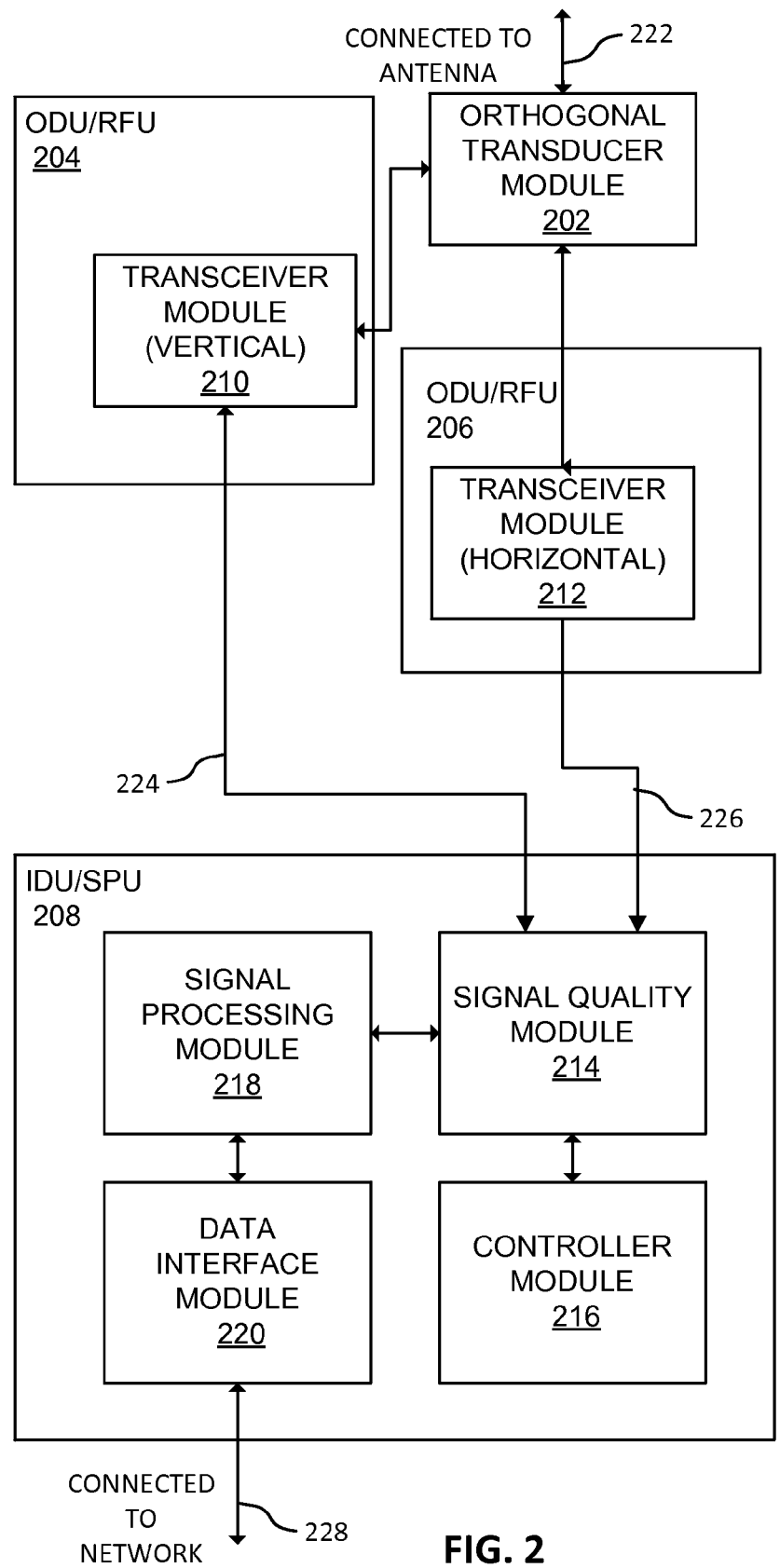
FIG. 2 is a block diagram regarding communication between two transceiver units in a communication system that utilizes orthogonal transmit and receive signals in some embodiments.

FIG. 2 depicts a microwave communication system that is configured to transmit and receive orthogonal systems utilizing multiple cables (i.e., without utilizing frequency division to transmit signals across the cables). In the system as depicted in FIG. 2, the orthogonal transducer module 202 is external to the two outdoor-unit/radio frequency units 204 and 206. Both outdoor-unit/radio frequency units 204 and 206 are separately coupled to the indoor unit/signal processing unit via a coaxial cable. Some embodiments described herein allow for communication between one or more outdoor-unit/radio frequency units with one or more indoor unit/signal processing units over a single cable by allowing frequency division of different receive and/or transmit signals.

At a high level, FIG. 2 is a block diagram regarding communication between two transceiver units in a communication system that utilizes orthogonal transmit and receive signals in some embodiments. FIG. 2 comprises two outdoor-unit (ODU)/radio frequency unit (RFU) 204 and 206 coupled to an orthomode transducer (OMT) 202. The OMT 202 is coupled to one or more antennas (not depicted). The ODU/RFU 204 comprises a transceiver module 210 configured to process signals that have been or will be vertically polarized (e.g., received signals that were vertically polarized and signals that are to be transmitted in a vertical polarization). Similarly, the ODU/RFU 206 comprises a transceiver module 212 configured to process signals that have been or will be horizontally polarized (e.g., received signals that were horizontally polarized and signals that are to be horizontally in a vertical polarization).

The OMT 202 is configured to route polarized signals to different signal paths based on polarization. In some embodiments, the OMT 202 is configured to polarize and depolarize signals. The OMT 202 may comprise an orthomode transducer and/or waveguide filters.

In one example, when a communications site is transmitting data, the OMT 202 receives modulated carrier signals from its respective transceiver modules 210 and 212, polarizes the modulated carrier signals according to the port designations (i.e., vertical polarization, and horizontal polarization), and provides the resulting polarized signals through the antenna. Conversely, when the communications site is receiving data, the OMT 202 receives polarized-diverse signals from the antenna and may depolarize the polarized-diverse signals, which may result in a modulated carrier signal for each polarized-diverse signal. These modulated carrier signals may be subsequently provided to transceiver modules 210 and 212 via ports that correspond to different polarized-diverse signals (e.g., the modulated carrier signal from the vertically polarized signal is provided to the transceiver 132 coupled to the vertical polarization port). In various embodiments, waveguide filters may both direct and convert the signals as necessary.

Each of the transceiver modules 210 and 212 is coupled to the IDU/SPU 208 via connections 224 and 226 which allows the transceivers to send and receive first and second data streams. Each of the transceiver modules 210 and 212 is also coupled to the OMT 202 through waveguide ports (e.g., rectangular waveguide ports). In some embodiments, these connections allow the transceivers 210 and 212 to send non-polarized carrier signals to, and receive depolarized carrier signals from, the OMT 202.

The transceiver modules 210 and 212 (and/or the signal processing module 218) may also modulate the data stream onto the carrier signal using a variety of data modulation schemes including, but not limited to, quadrature-amplitude modulation (QAM), phase-shift keying (PSK), frequency-shift keying (FSK), trellis coded modulation (TCM), and variations thereof.

Additionally, for some embodiments, the transceiver modules 210 and 212 (and/or the signal processing module 218) may further implement adaptive modulation schemes configured to adjust the data modulation of the data stream onto the carrier signals based on the conditions of the wireless channel. For example, when the wireless channel conditions between two communications sites change such that they adversely affect the vertically polarized signal traveling over the wireless channel but not the horizontally polarized signal, the transmitting communications site may adjust the data modulation of the carrier signal for the vertically polarized signal from 256 QAM to 16 QAM. This change may be applied uniformly to the horizontally polarized signal as well, or may be isolated to just the vertically polarized signal. In some embodiments, the modulation change implemented by the adaptive modulation may be uniform across all carrier signals provided by the signal quality module 108, and not just isolated to the polarization-diverse signal that is adversely affected by the wireless channel conditions. Additionally, in various embodiments, the determination or activation of an alternative modulation at the transmitting communications site 102 may be determined remotely by the receiving communications site 120, which then instructs the transmitting communications site 102 of its determination.

The OMT 202 is coupled to an antenna via a connection (e.g., circular waveguide port) which allows the OMT 202 to transmit and receive polarized wireless signals using the antenna.

The IDU/SPU 208 comprises a signal quality module 214, a controller module 216, a signal processing module 218, and a data interface module 220. The signal quality module 214 is configured to combine and split data streams. For example, the signal quality module 214 may be configured to split data streams onto cables 224 and 226. Similarly, the signal quality module 214 may be configured to combine data streams from cables 224 and 226 and provide the combined data streams to the signal processing module 218.

Those skilled in the art will appreciate that a modem may comprise all or part of the signal quality module 214 and the signal processing module 218.

The signal processing module 218 is coupled to the data interface module 220 and the signal quality module 214. According to some embodiments, when the communications system is transmitting, the signal processing module 218 may be configured to convert data received from the data interface module 220 to a processed data stream, which is then provided to the signal quality module 214. When the communications system is receiving, the signal processing module 218 may be configured to convert a processed data stream received from the signal quality module 214 to a form that may be received and further processed by customer equipment.

The signal processing module 218 may be configured to process data for a number of purposes including, for example, conversion of data (e.g., converting between data and I-Q data), data compression, error correction, processing to further reduce of correlation between the polarization-diverse signals, filtering, and measuring data signals. For example, by processing the data stream received from the signal quality module 214, the signal processing module 218 may measure, or assist in the measurement, of the overall strength of a signal stream received by the antenna. Additionally, based on wireless channel conditions, the signal processing module 218 may be utilized to determine whether a power adjustment is warranted for one or more of the polarization-diverse signals being transmitted (e.g., increase power of the vertically or horizontally polarized signal), determine whether more data should be diverted to one polarization-diverse signal over another, determine whether one of the polarization-diverse signals should be disabled, or assist in adaptive modulation process (e.g., assist to determine the best modulation for one or both transceiver modules).

Measurement of signal strength may be used to determine whether a received signal meets a minimum receive signal level threshold. From this determination, a receiving communications site may determine whether the wireless channel on which a signal is received is experiencing a fading condition, and may inform the transmitting communications site accordingly. To address the fading condition, the transmitting communications site may transmit data such that polarization-diverse signals carry redundant data, thereby increasing the likelihood that data transmitted is successfully received by the receiving communications site. Depending on the embodiment, the transmitting communications site may transmit data redundantly when instructed to do so by the receiving communications site, or based on the transmitting communications site's own determination.

For some embodiments, information regarding wireless channel conditions is shared between the communications sites. In addition to sharing the measured strength of the signal received (e.g., as a received signal strength indicator [RSSI]), communications sites may gather and share other information regarding observed conditions, such as signal-to-noise (SNR) ratio over the wireless channel and telemetry data).

The signal quality module 214 is coupled to the signal processing module 218 and a controller module 216. The controller module 216 may be configured to control operation of the signal quality module 214 (e.g., how to split or combine data streams). In some embodiments, the signal quality module 214 may be configured to split a data stream received from the signal processing module 218 into two data streams, which are then sent to the ODU/RFU 204 or 206 via connections 224 and 226, respectively. In various embodiments, the signal quality module 214 may be configured to combine a two data streams received from an ODU/RFU 204 and 206, via connections 224 and 226, respectively, into one data stream, and provide the one data stream to the signal processing module 218 for processing.

Those of ordinary skill in the art would appreciate that in some embodiments, the signal quality module 214 may be replaced by a router module that routes signals to a passive splitter module and a passive combiner module. For example, in some embodiments, the passive combiner module may comprise a passive concatenator, and a passive redundancy comparator.

For some embodiments, when the wireless channel being utilized is no longer experiencing a fading condition, the transmitting communications site may configure itself to divide the original data stream into two or more data streams such that each of the data streams contains a different portion of the original data stream, and to transmit those two or more streams using the polarization-diverse signals such that each polarization-diverse signal carries different data. In order to receive the data, the receiving communications site may configure itself accordingly to combine the data streams extracted from received polarization-diverse signals, and create a single data stream.

For instance, the signal quality module 214 for the transmitting communications site may be instructed (by its respective control module 216) to split a first data stream and a second data stream from the original data stream, each of the first and second data streams containing mutually exclusive portions of data from the original data stream. Subsequently, each of the first and second data streams may be provided by the signal quality module 108 to the pair of transceiver modules 210 and 212—one data stream going to a transceiver (vertical) module 210, and the other data stream going to a transceiver (horizontal) module 212. Depending on the embodiment, the splitting process may divide the original data stream based on a number of criteria including, for example, data type, data block size, and priority of data.

In some embodiments, the receiving communications site may configure itself to receive different data on each of the polarization-diverse signals. For example, the signal quality module 214 may be instructed to concatenate portions of a first data stream received with portions of a second data stream received in order to create a single data stream comprising data from the transmitting communications site.

One of ordinary skill in the art would readily understand that where some embodiments implement point-to-point wireless communications (e.g., microwave/millimeter frequency communications system), bi-directional data transfer between two communications site may be facilitated using two or more separate wireless channels between the sites. Each wireless channel may have a different center frequency and carrying its own set of polarization-diverse signals.

As used herein, the term set may refer to any collection of elements, whether finite or infinite. The term subset may refer to any collection of elements, wherein the elements are taken from a parent set; a subset may be the entire parent set.

As used herein, the term module might describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of some embodiments are implemented in whole or in part using software, in some embodiments, these software elements can be implemented to operate with a digital device capable of carrying out the functionality described with respect thereto.

Figure 3:
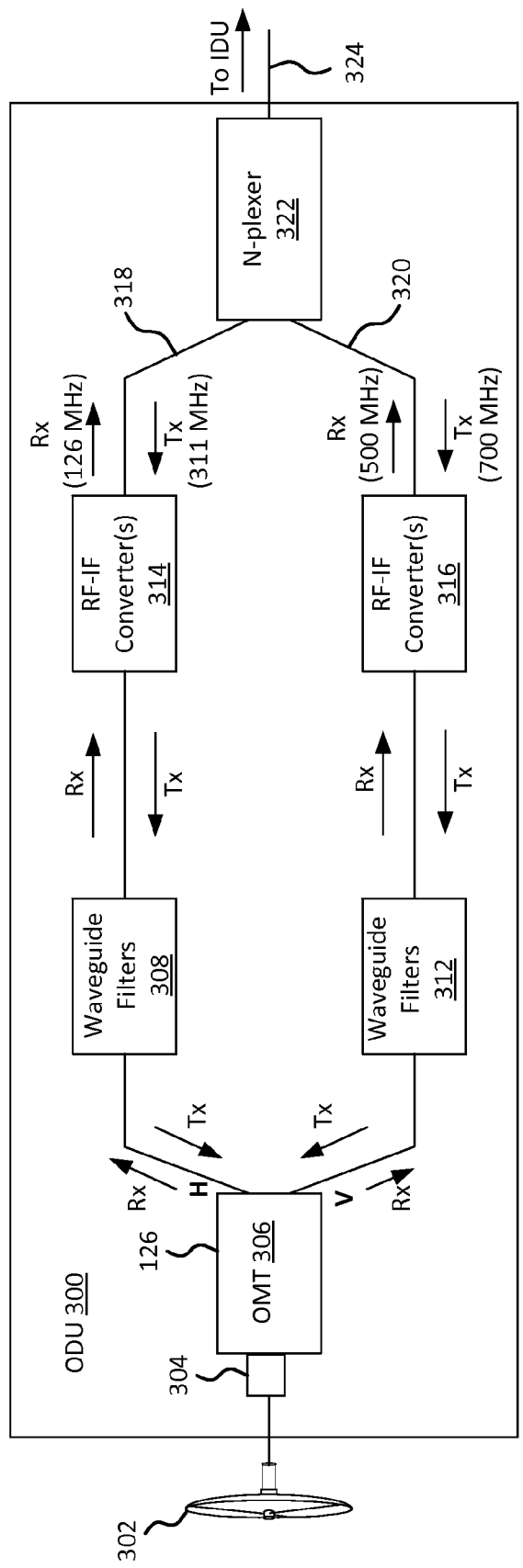
FIG. 3 depicts an exemplary embodiment of a wireless communication system to transmit and receive orthogonally polarized system between an ODU and an IDU (not depicted) over a coaxial cable in some embodiments.

FIG. 3 depicts an exemplary embodiment of a wireless communication system to transmit and receive orthogonally polarized system between an ODU 300 and an IDU (not depicted) over a coaxial cable 324 in some embodiments. In particular, FIG. 3 depicts an ODU 300 that provides multiple receive signals and receives multiple transmit signals over a single coaxial cable 324 to an IDU or modem.

The ODU 300 comprises a circular waveguide 304, an orthomode transducer (OMT) 306, waveguide filters 308 and 312, radio frequency (RF)—intermediate frequency (IF) converters 314 and 316, and N-plexer 322. The OMT 306 is coupled to the antenna 302 via the circular waveguide 304. The OMT 306 is also coupled to waveguide filters 308 and 312 via signal paths. The waveguide filters 308 and 312 are electrically coupled to RF-IF converter(s) 314, and 316, respectively. The N-plexer 322 is electrically coupled to the RF-IF converter(s) 314 and 316 via signal paths 318 and 320. The N-plexer 322 is further electrically coupled to the IDU (not depicted) via the coaxial cable 324.

The antenna 302 may be any antenna used for communication. For example, the antenna 302 may be a parabolic antenna or any type of antenna. The antenna 302 may be part of a microwave communication system. In some embodiments, the antenna 302 is configured to receive polarized communication systems. There may be any number of antennas including, for example, different antennas for receiving differently polarized signals. For the purposes of this discussion, polarized signals is referred to as including horizontally polarized and vertically polarized. Those skilled in the art will appreciate that any orthogonal signals may be utilized.

The antenna 302 may be coupled with the OMT 306 via a circular waveguide 302. In some embodiments, the circular waveguide 302 is part of a resizable collar that may be mounted to or on the antenna 302. The waveguide 302 may be any waveguide kind or type of waveguide. For example, the waveguide 302 may be hollow or dielectric. In some embodiments, the waveguide 302 comprises a waveguide of any shape.

The OMT 306 is an orthomode transducer that may be coupled and/or include the circular waveguide 304. The OMT 306 may be or include a microwave circulator. In one example, the OMT 306 is or includes a polarization duplexer. In various embodiments, the OMT 306 directs polarized signals. For example, the OMT 306 may receive a horizontally polarized receive signal and a vertically polarized receive signal from the antenna 302. The OMT 306 may direct the horizontally polarized receive signal to the waveguide filters 308 and direct the vertically polarized receive signals to the waveguide filters 312.

In some embodiments, the OMT 306 is contained within the ODU 300. By coupling the OMT 306 and/or the waveguide filters 308 and/or 312 within the same ODU 300 (e.g., within the same enclosure), ports and/or cabling between the components may be reduced thereby saving cost and reducing the parts necessary to install and maintain the system. In one example, the OMT 306 may be directly coupled to the waveguide filters 308 and 312 via a waveguide.

The waveguide filters 308 and 312 may be electrically coupled (e.g., via signal paths) with RF-IF converter(s) 314 and 316, respectively.

Those skilled in the art will appreciate that, in some embodiments, the OMT 306 is not a part of the ODU 300 (e.g., the OMT 306 is outside of the ODU 300). The OMT 306 may be coupled to the ODU 300 in any number of ways. In one example, the circular waveguide 304, the OMT 306, and the waveguide filters 308 and 312 may be outside the ODU 300. The ODU 300 may be coupled to the external waveguide filters 308 and 312 in any number of ways including, for example, over a coaxial cable.

Although FIG. 3 may appear to depict a signal path between the waveguide filters 308 and 312 and the OMT 306, those skilled in the art will appreciate that the waveguide filters 308 and 312 may be coupled directly to the OMT 306 (e.g., via two or more rectangular waveguides).

Waveguide filters 308 and 312 may each be configured to filter and direct transmit and receive signals. The waveguide filters 308 and 312 may prevent receive signals from propagating back towards the antenna 302. Similarly, the waveguide filters 308 and 312 may prevent transmit signals from propagating back towards the transmitters or components of the transmitters (e.g., RF-IF converter(s) 314 and 316, respectively).

Each waveguide filter 308 and/or 312 may comprise a transmit filter and a receive filter. The transmit filter may be configured to receive signals from a transmitter and provide the signals to the antenna 302 via a stacked waveguide circulator component or OMT 306 (which may provide the signal to the antenna 302 via the circular waveguide 304). In one example, if a signal is provided through the transmit filter to the transmitter (e.g., a signal is provided from the antenna 302), the transmit filter may block the signal. Subsequently the signal may be returned or reflected back to a stacked waveguide circular or OMT 306 which may redirect the signal to the next port (e.g., the receive filter). The transmit filter is a filter that may reduce or eliminate undesired aspects (e.g., noise) of a signal to be transmitted from a transmitter to the antenna.

The receive filter may be configured to receive signals from an antenna 302 (via the stacked waveguide circulator component or OMT 306) and provide the signals to a receiver (which may comprise the RF-IF converter 314 or 316). In one example, if a receive signal is provided back towards the antenna 302, the receive filter may block the signal. Subsequently the signal may be returned or reflected to the RF-IF converter 314 or 316. The receive filter, like the transmit filter, may reduce or eliminate undesired aspects (e.g., noise) of a received signal from the antenna. The transmit filter and the receiver filter may be stacked and/or coupled.

In some embodiments, an SMA isolator is a SubMinitature version A (SMA) coaxial RF connector coupled between a waveguide filter and a transmitter or receiver. In one example, the SMA isolator may transmit microwave or radio frequency power in one direction. The SMA isolator may shield equipment. The SMA isolator may be coupled to the transmit filter and a transmitter. In another example, the SMA isolator is coupled to the receiver filter and a receiver.

In some embodiments, the SMA isolator prevents signals from being provided through the transmit filter back to the transmitter. If a signal is provided through the transmit filter to the transmitter, the SMA isolator may block the signal. Subsequently the signal may be returned or reflected back to the stacked waveguide circular or OMT 306 which may redirect the signal to the receive filter.

Although only an OMT 306, waveguide filters 308 and 312, RF-IF converter(s) 314 and 316, and N-plexer 322 are depicted as being contained within the ODU 300, those skilled in the art will appreciate that the ODU 300 may comprise any devices, circuits or components. For example, the RF-IF converter(s) may be a part of a transmitter, receiver, or both. In some embodiments, a transmitter may comprise predistorter modules configured to add predistortion to cancel or interfere with nonlinear artifacts generated by a power amplifier or the like. Similarly, the transmitter and/or receiver may comprise gain adjusters, phase adjusters, and/or filters for example.

The RF-IF converter 314 and 316 are any converters configure to upconvert or downconvert signals. In various embodiments, the RF-IF converters 314 comprise two different converters. For example, one of the RF-IF converters 314 may be configured to downconvert an RF transmit signal from the antenna 302 to IF. This RF-IF converter 314 may be considered as part of a transmitter. Another one of the RF-IF converters 314 may be configured to upconvert an IF receive signal from the N-plexer 322 to RF. This other RF-IF converter 314 may be considered as part of a receiver.

Those skilled in the art will appreciate that although FIG. 3 depicts RF-IF converter(s) 314 and 316, there may be receivers and transmitters or components associated with transmitting or receiving between the N-plexer 322 and the waveguide filters 308. For example, a first RF-IF converter 314 may be on a first signal path between the N-plexer 322 and the waveguide filters 308. A second RF-IF converter 314 may be on a second signal path between the N-plexer 322 and the waveguide filters 308. Similarly, two different RF-IF converters 316 may be on third and fourth signal paths, respectively, between the N-plexer 322 and the waveguide filters 308.

In various embodiments, a first RF-IF converter 314 is configured to convert a receive signal from the RF frequency to an intermediate frequency. A first RF-IF converter 316 may also be configured to convert a different receive signal from the RF frequency to a different intermediate frequency for frequency division. For example, the RF-IF converter 314 may convert the RF receive signal (received as a horizontally polarized signal by the antenna 302) to 126 MHz while the RF-IF converter 316 may convert a different RF receive signal (received as a vertically polarized signal by the antenna 302) to 500 MHz. Those skilled in the art will appreciate that the RF-IF converters 314 and 316 (or one or more other components of the ODU 300) may convert the two different receive signals to different frequencies to allow for frequency division and transmission over the coaxial cable 324.

Similarly, in various embodiments, a second RF-IF converter 314 is configured to convert a transmit signal from the IF frequency to an RF frequency. A second RF-IF converter 316 may also be configured to convert a different transmit signal from a different IF frequency to the RF frequency. In order to maintain two or more transmit signals over the coaxial cable, the transmit signals may have different frequencies. For example, the transmit signal received by the RF-IF converter 314 via signal path 318 may be 311 MHz while the transmit signal received by the RF-IF converter 316 via signal path 320 may be 700 MHz. Those skilled in the art will appreciate that the transmit signals may be at any frequency.

In some embodiments, the RF-IF converter 314 and RF-IF converter 316 may not convert a signal from RF to IF or from IF to RF, rather, the converters may convert a signal from RF to any frequency (e.g., baseband) and convert any frequency to RF.

The N-plexer 322 is a multi-band device that may be configured to direct or route multiple signals at different frequencies. For example, the N-plexer 322 may receive a receive signal at 126 MHz from RF-IF converter(s) 314 and a receive signal at 316 MHz from RF-IF converter(s) 316. The N-plexer 322 may direct both receive signals over the single cable 324.

The N-plexer 322 may also receive multiple transmit signals at different frequencies and route the transmit signals. For example, the N-plexer 322 may receive a transmit signal at 311 MHz and route the transmit signal to path 318. Similarly, the N-plexer 322 may receive a transmit signal at 700 MHz and route the transmit signal to path 320. The N-plexer 322 may route a plurality of signals based on frequencies of the signals.

Although signal path 318 is depicted as a signal path, those skilled in the art will appreciate that the signal path 318 may be multiple paths (e.g., the signal path 318 may comprise two separate signal paths electrically coupled to different converters of the RF-IF converters 314, respectively). Similarly, although signal path 320 is depicted as a single path, the signal path 320 may also be multiple paths (e.g., the signal path 320 may comprise two separate signal paths electrically coupled to different converters of the RF-IF converters 316, respectively). Multiple signal paths coupled to the N-plexer 322 are further discussed with regard to FIG. 4.

Although an N-plexer 322 is depicted in FIG. 3, those skilled in the art will appreciate that any device, circuit(s), and/or component(s) may be configured to maintain and/or propagate multiple signals across cable 324 without interfering the signals or the signals interfering with each other.

The coaxial cable 324 couples the ODU 300 and a modem or the IDU (not depicted in FIG. 3. The coaxial cable 324 is not limited to coax but may be any cable or combination of cables.

Figure 4:
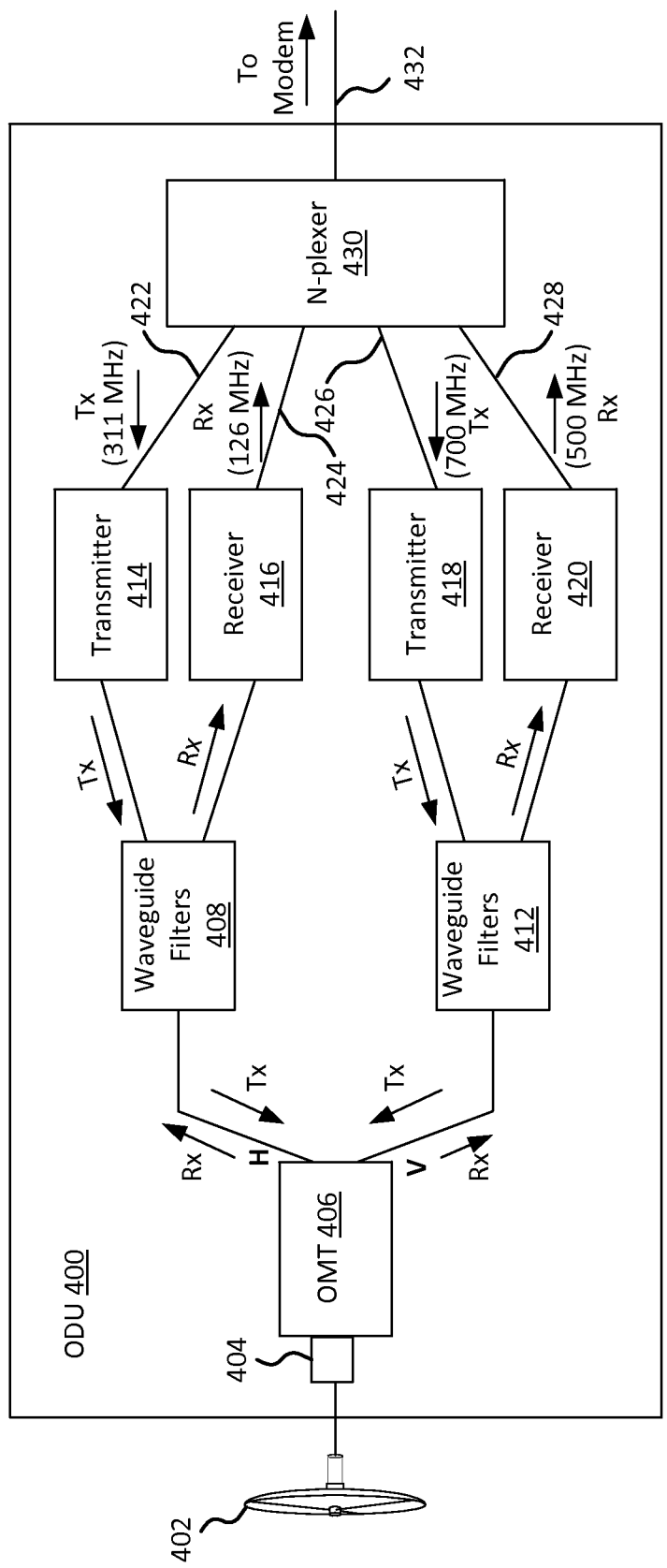
FIG. 4 depicts a different exemplary embodiment of a wireless communication system to transmit and receive orthogonally polarized signals between receivers/transmitters and a modem in some embodiments.

FIG. 4 depicts a different exemplary embodiment of a wireless communication system to transmit and receive orthogonally polarized signals between receivers/transmitters and a modem in some embodiments. FIG. 4 depicts an ODU 400 which is coupled to an antenna 402 and a cable 432. Although FIG. 4 depicts an ODU 400 or an enclosure housing similar equipment to an ODU, those skilled in the art will appreciate that the ODU 400 may be include one or more units. Further, the components of the ODU 400 may be housed in different enclosures. In some embodiments, one or more of the components of the ODU 400 may not be enclosed.

Similar to ODU 300, the ODU 400 comprises a circular waveguide 404, an orthomode transducer (OMT) 406, and waveguide filters 408 and 412. Waveguide filters 408 may be coupled to transmitter 414 and receiver 416 over separate signal paths. Similarly, the waveguide filters 412 may be coupled to transmitter 418 and receiver 420 over separate signal paths.

Transmitter 414 and receiver 416 may be electrically coupled to the N-plexer 430 via signal paths 422 and 424, respectively. Transmitter 418 and receiver 420 may also be electrically coupled to the N-plexer 430 via signal paths 426 and 428, respectively. The N-plexer 430 is further electrically coupled to a modem or IDU (not depicted) via the cable 432.

The antenna 402 may be similar to the antenna 302. For example, the antenna 402 may be a parabolic antenna or any type of antenna that, in this example, is configured to transmit and receive polarized communication systems.

The antenna 402 may be coupled with the OMT 406 via a circular waveguide 402. Like the OMT 306, the OMT 406 is an orthomode transducer that may be coupled and/or include the circular waveguide 404. The OMT 406 may be a microwave circulator. In one example, the OMT 406 is a polarization duplexer.

Waveguide filters 308 and 412, similar to waveguide filters 308 and 312, may each be configured to filter and direct transmit and receive signals. The waveguide filters 408 and 412 may prevent receive signals from propagating back towards the antenna 402. Similarly, the waveguide filters 408 and 412 may prevent transmit signals from propagating back towards the transmitters 414 and 418, respectively.

The transmitters 414 and 418 are any components configured to process and/or convert signals to an RF or any frequency to be transmitted by the antenna 402. The transmitter 414 may receive a transmit signal at 411 MHz from N-plexer 430 via signal path 422. The transmit signal may ultimately be transmitted by the antenna 402 as a horizontally polarized signal. The transmitter 414 may upconvert the received transmit signal to an RF frequency and provide the processed, upconverted transmit signal to the waveguide filters 408. The transmitter 418 may receive a transmit signal at 700 MHz from N-plexer 430 via signal path 426. The transmit signal may ultimately be transmitted by the antenna 402 as a vertically polarized signal. The transmitter 418 may upconvert the received transmit signal to an RF frequency and provide the processed, upconverted transmit signal to the waveguide filters 412.

The receivers 416 and 420 are any components configured to process and/or convert signals from an RF to an IF, baseband, or any frequency to be provided to the modem (not depicted) via the cable 432. The receivers 416 and 420 may convert receive signals (e.g., horizontally polarized signals and vertically polarized signals received by the antenna 402) from an RF frequency to different frequencies that will allow the N-plexer 430 to provide the converted receive signals over the cable 432.

The receiver 416 may receive a receive signal from the waveguide filters 408 and convert the receive signal to 126 MHz which may be provided to the N-plexer 430 via signal path 422. The receive signal may have been received by the antenna 402 as a horizontally polarized signal. Similarly, the receiver 420 may receive a receive signal from the waveguide filters 412 and convert the receive signal to 500 MHz which may be provided to the N-plexer 430 via signal path 428. The receive signal may have been received by the antenna 402 as a vertically polarized signal.

The N-plexer 430 may be similar to the N-plexer 322. The N-plexer 430 is a multi-band device that may be configured to direct or route multiple signals at different frequencies. For example, the N-plexer 430 may receive a receive signal at 126 MHz from receiver 416 via signal path 424 and receive a receive signal at 500 MHz from receiver 420 via signal path 428. The N-plexer 430 may direct both receive signals over the single cable 432.

The N-plexer 430 may also receive multiple transmit signals at different frequencies and route the transmit signals. For example, the N-plexer 430 may receive a transmit signal at 311 MHz from the single cable 432 and route the transmit signal over signal path 422. Similarly, the N-plexer 430 may receive a transmit signal at 700 MHz and route the transmit signal to path 426. The N-plexer 430 may route a plurality of signals based on frequencies of the signals.

Figure 5:
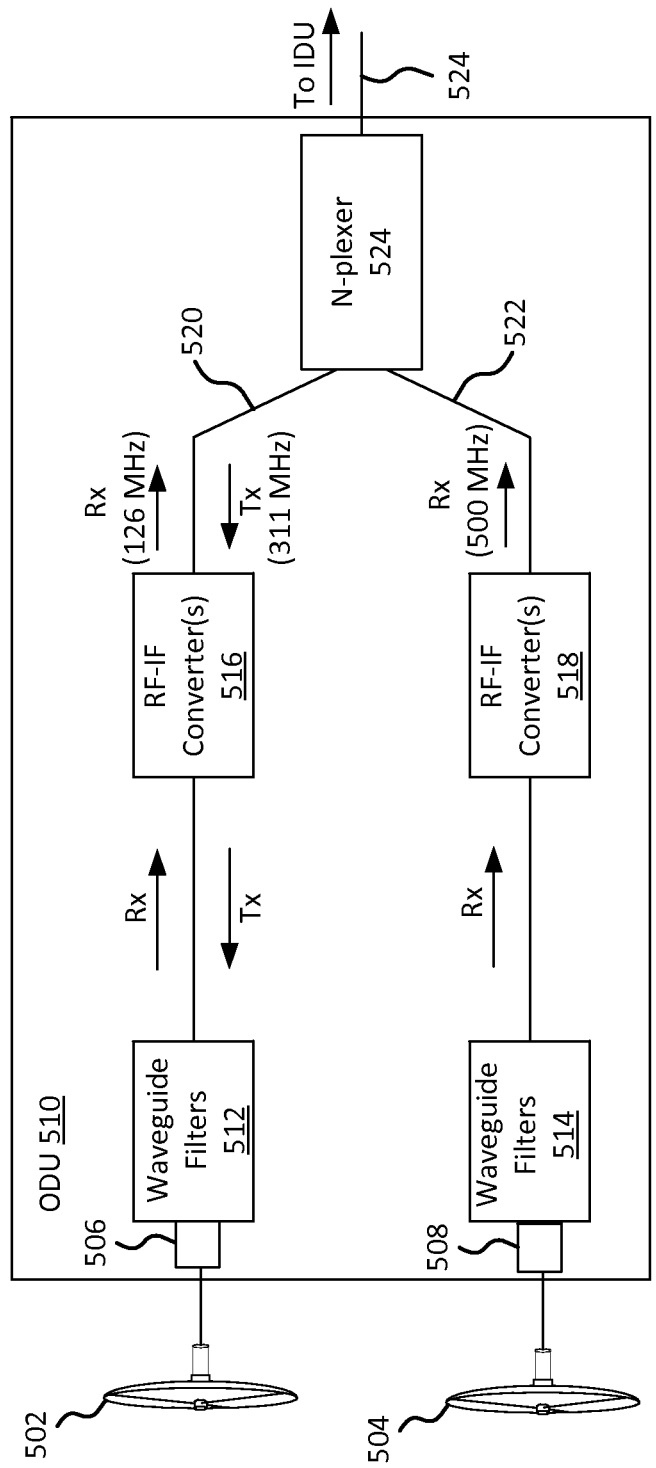
FIG. 5 is block diagram of another ODU in a communication system that utilizes antenna spatial diversity in some embodiments.

FIG. 5 is block diagram of another ODU 510 in a communication system that utilizes antenna spatial diversity in some embodiments. The ODU 510 may be in communication with main antenna 502 and diversity antenna 504. In various embodiments, two receive signals, including a main receive signal and a diversity receive signal, may be received by the ODU 510. The diversity receive signal may be utilized to correct the main receive signal if the main receive signal is weak or otherwise in error due to a fading channel. In some embodiments, only the main antenna 502 is utilized for transmitting signals from the ODU 510. In this example, the ODU 510 may provide a single transmit signal to the main antenna 502 and receive two receive signals from the main antenna 502 and diversity antenna 504.

The ODU 510 may comprise circular waveguides 506 and 508 coupled to waveguide filters 512 and 514, respectively. The RF-IF Converter(s) 516 and 518 may be electrically coupled to the waveguide filters 512 and 514, respectively. The RF-IF Converter(s) 516 and 518 may be coupled to the N-plexer 524 via signal paths 520 and 522, respectively. The circular waveguides 506 and 508, waveguide filters 512 and 514, RF-IF Converter(s) 516 and 518, and N-plexer 524 may be similar to the circular waveguides, waveguide filters, RF-IF Converter(s) and N-plexer of FIGS. 3 and 4.

In various embodiments, the N-plexer 524 may receive a transmit signal from the cable 524 to provide to the main antenna 502 (e.g., via signal path 520). The transmit signal may be at a different frequency than the frequency of the receive signals or any other signal on the cable 524. For example, the frequency of the transmit signal may be 311 MHz while the receive signals may be 126 MHz and 500 MHz, respectively.

In various embodiments, the cable 524 may provide multiple receive and/or transmit signals as well as power and/or telemetry. The N-plexer 524 and another N-plexer (see FIG. 6) may be electrically coupled via the cable 524. The N-plexers may provide signals to the cable 524 as well as direct signals from the cable 524 to a particular signal path based on the frequency of the signal (e.g., each signal on the cable 524, including but not limited to receive signals, transmit signals, power signals, and telemetry signals, may each have a unique frequency to take advantage of frequency division).

Those skilled in the art will appreciate that power may be provided by any power module over the cable to the ODU 510 and/or one or more components for the ODU 510. The power module may, for example, provide DC power to the ODU 510.

The telemetry signal may include data that is used to communicate between components of the IDU (e.g., modem) and the ODU 510. For example, in some split-mount embodiments, a radio frequency (RF) signal (e.g., microwave frequency signal) may be downconverted to an IF frequency and subsequently received at the IDU (e.g., at a modem). Errors or signal corrections may be identified by one or more components of the IDU. An error detection module in the IDU may be transmitted back to the ODU 510 as telemetry data, which the ODU 510 translates into adjustments which may, for example, be applied (e.g., the RF signal may be demodulated, phase corrected based on the telemetry data, and remodulated within the ODU 510).

Figure 6:
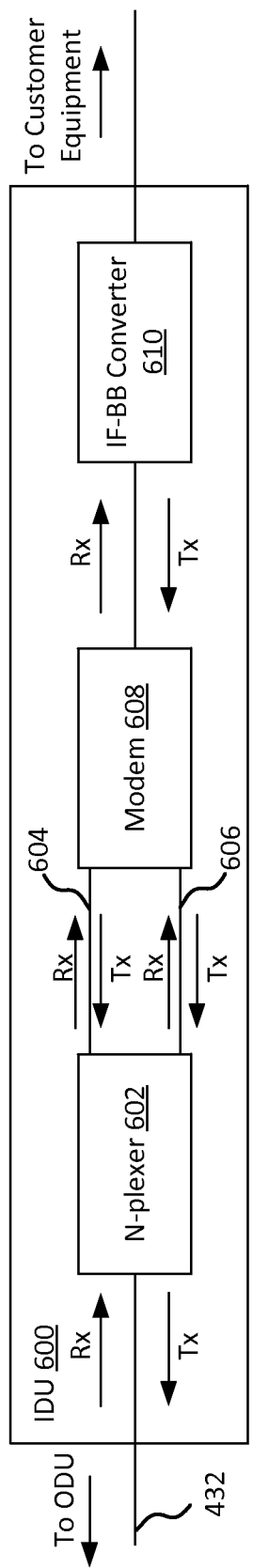
FIG. 6 is block diagram of an IDU that communicates with an ODU over a single cable in some embodiments.

FIG. 6 is block diagram of an IDU 600 that communicates with an ODU over a single cable 432 in some embodiments. The IDU 600 may be any unit configured to communicate with the ODU 400 over the cable 432. Although FIG. 6 identifies an IDU 600, those skilled in the art will appreciate that systems and methods described herein may, in some embodiments, be utilized with an N-plexer and a modem that communicates with a separate unit over the cable 432.

The IDU 600 may comprise an N-plexer 602 electrically coupled with the cable 432 and a modem 608. The modem 608 may further be coupled with the optional IF-BB converter 610 which may be in communication with customer premises equipment. Those skilled in the art will appreciate that the IDU 600 may comprise any number of components, including, for example, a power module and a telemetry module. The power module may be configured to provide power to the ODU 400 via the cable 432. The telemetry module may be configured to detect and correct for errors in received signals and provide corrective information to the ODU 400 via the cable 432. Further, the IDU 600 may comprise gain adjusters, filters, and/or phase adjusters, or the like.

In some embodiments, the components of the IDU 600 may be in any order. In some embodiments, the IF-BB converter 610 may be coupled to the N-plexer 602 and the modem 608. For example, the IF-BB converter 610 may be configured to downconvert diversity receive signals received from the N-plexer 602 before providing the downconverted diversity receive signals to the modem 608. Similarly, the IF-BB converter 610 may upconvert diversity transmit signals to different frequencies. The IF-BB converter 610 may receive the diversity transmit signals from the modem 608 and provide the upconverted signals to the N-plexer 602.

In various embodiments, the N-plexer 602 may direct diversity receive signals from the cable 432 to the signal path 604 or signal path 606 based on the different frequencies of the two diversity receive signals. The N-plexer 602 may also receive transmit signals from the modem 608. The diversity transmit signals may each have different frequencies than each other and different frequencies than the diversity receive signals. In some embodiments, the N-plexer 602 receives the two transmit signals via two other signal paths (e.g., other than the signal paths 604 and 606). For example, there may be four signal paths between the modem 608 and the N-plexer 602. Each different signal path may be for a different receive or transmit signal. Those skilled in the art will appreciate that there may be any number of signals and corresponding signal paths between the modem 608 and the N-plexer 602.

The modem 608 may be any modem configured to demodulate diversity receive signals and modulate diversity transmit signals (e.g., upconverted signals to be transmitted received from the customer equipment). In various embodiments, the modem 608 converts the modulated diversity transmit signals to different frequencies (e.g., 311 MHz and 700 MHz, respectively).

The optional IF-BB converter 610 may be any converter configured to upconvert signals to be transmitted received from customer equipment (e.g., from a baseband to an IF frequency) and downconvert signals received from the modem 608 (e.g., demodulated receive signals from IF frequency to a baseband frequency). In various embodiments, the IF-BB converter 610 converts the signals to be transmitted to different frequencies (e.g., 311 MHz and 700 MHz, respectively). Although the IF-BB converter 610 is identified as "IF-BB," the IF-BB converter 610 may upconvert signals to be transmitted to any frequency (not just IF) and the IF-BB converter 610 may downconvert signals to any frequency (not just baseband).

In some embodiments, the IF-BB converter 610 is optional. For example, the modem 608 may downconvert the diversity receive signals received from the N-plexer 602 and upconvert signals to be transmitted. In various embodiments, the modem 608 converts the signals to be transmitted to different frequencies (e.g., 311 MHz and 700 MHz, respectively).

In various embodiments, there may any number of signal paths between the modem 608 and the IF-BB converter 610 (if present). For example, the IF-BB converter 610 may provide upconverted transmit signals (which each have frequencies distinct from each other) to the modem 608 over two different signal paths. The modem 608 may provide demodulated receive signals to the IF-BB converter 610 over one or two other signal paths.

In various embodiments, the IDU 600 or second unit may include a power module configured to provide power to the ODU 400. For example, the power module may provide a power signal to the N-plexer 602. The N-plexer 602 may provide the power signal to the single cable 432. Since the power signal may be DC power, the frequency of the power signal is different (e.g., 0 Hz) from that of other signals that may be propagating on the cable 432. As a result, the N-plexer 430 of FIG. 4 may receive the power signal from the cable and provide the power signal to the correct path to power the ODU 400.

Further, the IDU 600 or second unit may include a telemetry module configured to provide a telemetry signal to the ODU 400 to allow for communication between the two units. The telemetry signal may be at a frequency that is different than other signals propagating across the single cable 432. For example, the telemetry module may provide a telemetry signal to the N-plexer 602. The N-plexer 602 may provide the telemetry signal to the single cable 432. Since the frequency of the telemetry signal is different (e.g., 5 HMz) from that of other signals that may be propagating on the cable 432, the N-plexer 430 of FIG. 4 may receive the telemetry signal from the cable and provide the telemetry signal to the correct path to allow for communication.

In various embodiments, the IDU 600 may comprise a signal quality module, controller module 216, signal processing module 218, and/or a data interface module 220 as discussed in FIG. 2. In various embodiments, the signal quality module 214 and/or the signal processing module 218 may apply a receive signal from a diversity antenna (in an antenna spatial diversity system) when errors are detected. In some embodiments, the receive signal from the diversity antenna may be disregarded (e.g., when the quality of the receive signal from the main antenna is high or above a threshold).

Although a single cable 432 is depicted in FIGS. 3-6, those skilled in the art will appreciate that any number of cables may be utilized. For example, multiple signals at different frequencies may propagate through any of the cables utilizing systems and methods described herein.

Figure 7:
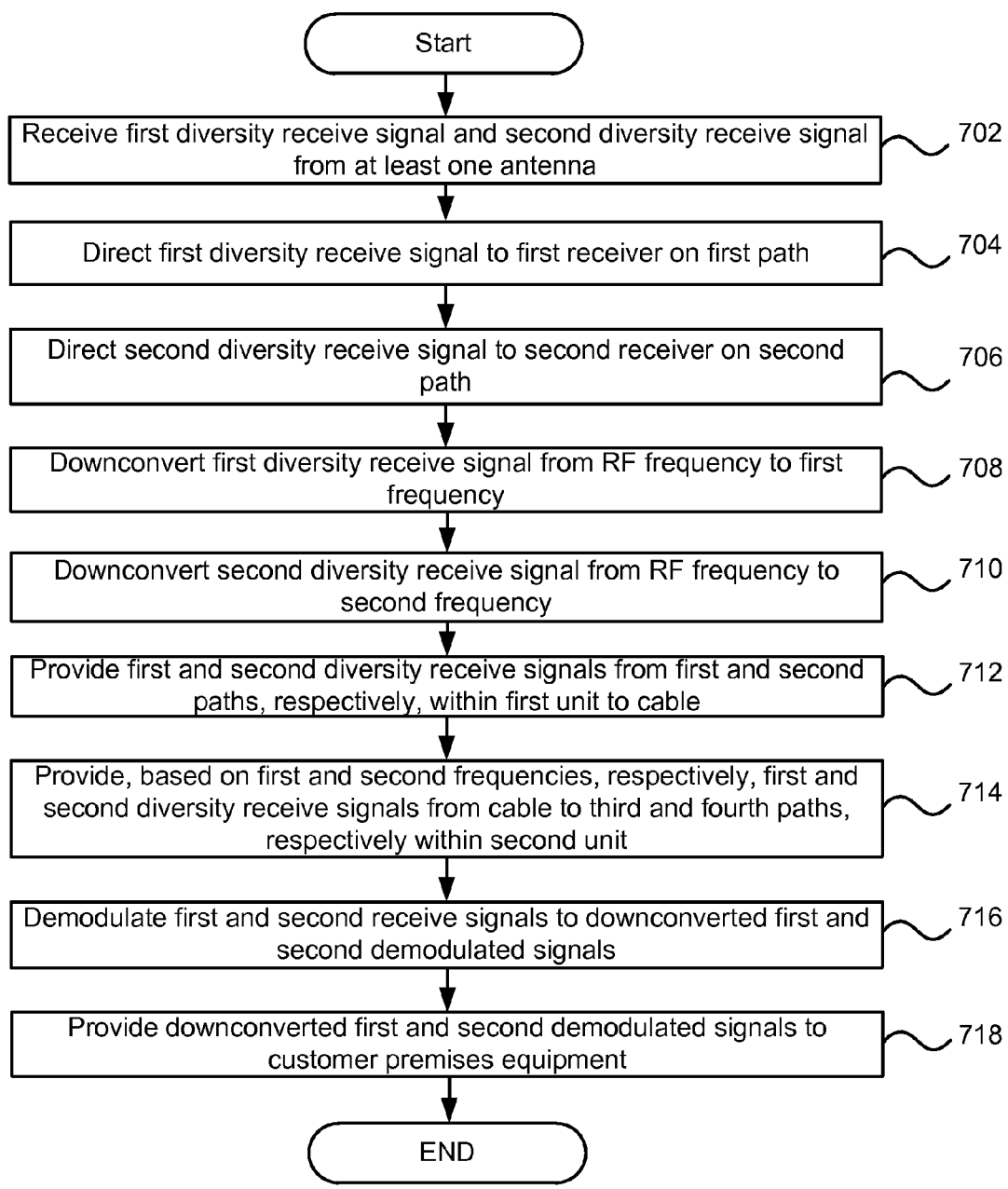
FIG. 7 is a flow diagram for processing two or more receive signals over a split mount system utilizing a single cable in some embodiments.

FIG. 7 is a flow diagram for processing two diversity receive signals over a split mount system utilizing a single cable in some embodiments. In step 702, at least one antenna receives a first diversity receive signal and a second diversity receive signal. In some embodiments, the first and second diversity receive signals have orthogonal polarizations and may be received by a single antenna.

Although polarization systems are discussed regarding FIG. 7, various systems and methods described herein may apply to main and diversity receive signals received by two spatially diverse antennas, respectively. Those skilled in the art will appreciate that any number of diversity receive signals may be received over any number of antennas.

In step 704, an OMT 406 within an ODU 400 may receive orthogonally polarized first and second diversity receive signals from the antenna 402 via a circular waveguide 404 and provide the first diversity receive signal to waveguide filters 408 via a first path (e.g., rectangular waveguide coupling the OMT 406 to the waveguide filters 408). In step 706, the OMT 406 may provide the second diversity receive signal to waveguide filters 412 via a second path (e.g., a different rectangular waveguide coupling the OMT 406 to the waveguide filters 412). In various embodiments, the OMT 406 may route the first and second diversity receive signals to the waveguide filters 408 and 412, respectively, based on the polarization of the signals.

In some embodiments of an antenna diversity system, the main antenna may provide the first diversity receive signal to a first receiver on a first path and the diversity antenna may provide the second diversity receive signal to a second receiver on a second path.

In step 708, a receiver 416 may receive and downconvert the first diversity receive signal from an RF frequency to a first frequency. In some embodiments, the first diversity receive signal may be provided to the receiver 416 from the waveguide filters 408. The receiver 416 may process (e.g., filter, adjust the gain, adjust phase, and/or remodulate the first diversity receive signal) as well as downconvert the first diversity receive signal. In some embodiments, the first diversity receive signal may be downconverted to an IF frequency.

In step 710, a receiver 420 may receive and downconvert the second diversity receive signal from an RF frequency to a second frequency. In a manner similar to step 708, the first diversity receive signal may be provided to the receiver 420 from the waveguide filters 412. The receiver 420 may process (e.g., filter, adjust the gain, adjust phase, and/or remodulate the second diversity receive signal) as well as downconvert the second diversity receive signal.

In some embodiments, the second diversity receive signal may be downconverted to an IF frequency that is at a different frequency than the downconverted first diversity receive signal. For example, the first diversity receive signal may be downconverted to 126 MHz and the second diversity receive signal may be downconverted to 500 MHz.

In step 712 and 714, the N-plexer 430 may receive the first diversity receive signal from the receiver 416 via signal path 424 and may receive the second diversity receive signal from the receiver 420 via signal path 428. The N-plexer 430 may provide both signals to the single cable 432 to provide the signals to a modem or other unit.

Those skilled in the art will appreciate that the cable may simultaneously propagate multiple signals at different frequencies. The N-plexer 430 of the ODU 400 and the N-plexer 602 of the IDU 600, for example, may be configured to route signals from the single cable 432 based on the different frequencies of the propagating signals. For example, the single cable 432 may simultaneously propagate six or more signals including, for example, two transmit signals to be transmitted by the ODU, two receive signals to be demodulated by the IDU, a power signal to power the ODU, and a telemetry signal to allow for communication between the two units. As a result, few cables between the two units may be utilized thereby reducing complexity, saving costs, and reducing ports and cables within the system.

In step 714, the N-plexer 602 of FIG. 6 provides first and second diversity receive signals from the cable to first and second signal paths within the second unit (e.g., IDU 600). The IDU 600 or second unit may be any unit with a modem (e.g., modem 608). The N-plexer 602 may provide the first and second diversity receive signals from the cable to the first and second signal paths based on the frequencies of the signals.

In step 716, the modem 608 may demodulate the first and second diversity receive signals received from the first and second signal paths to generate the first and second demodulated signals. In some embodiments, the first and second demodulated signal may contain different data. In other embodiments, one of the two signals is to provide error correction caused by distortion, interference, and/or fading conditions. In some embodiments, the modem 608 may provide a single corrected demodulated signal, provide two demodulated signals, or provide a single demodulated signal with information from both receive signals (e.g., for increased capacity).

In various embodiments, the modem 608 may downconvert the first and second diversity receive signals. In one example, the modem 608 may downconvert the signals to a baseband frequency or any frequency. In some embodiments, the modem 608 and/or the IF-BB converter 610 may downconvert the first and second diversity signals (or the first and second demodulated signals.

Those skilled in the art will appreciate that the modem 608 may further format the first and second demodulated signals to a form that may be utilized by the customer premises equipment. For example, the modem 608 may prepare the first and second demodulated signals for Ethernet or TDM.

In step 718, the downconverted signal(s) are provided to customer premises equipment.

Those skilled in the art will appreciate that the steps of FIG. 7 may be performed in any order. Further, any of the steps or any combination of steps may be performed simultaneously with other steps or other combination of steps.

Figure 8:
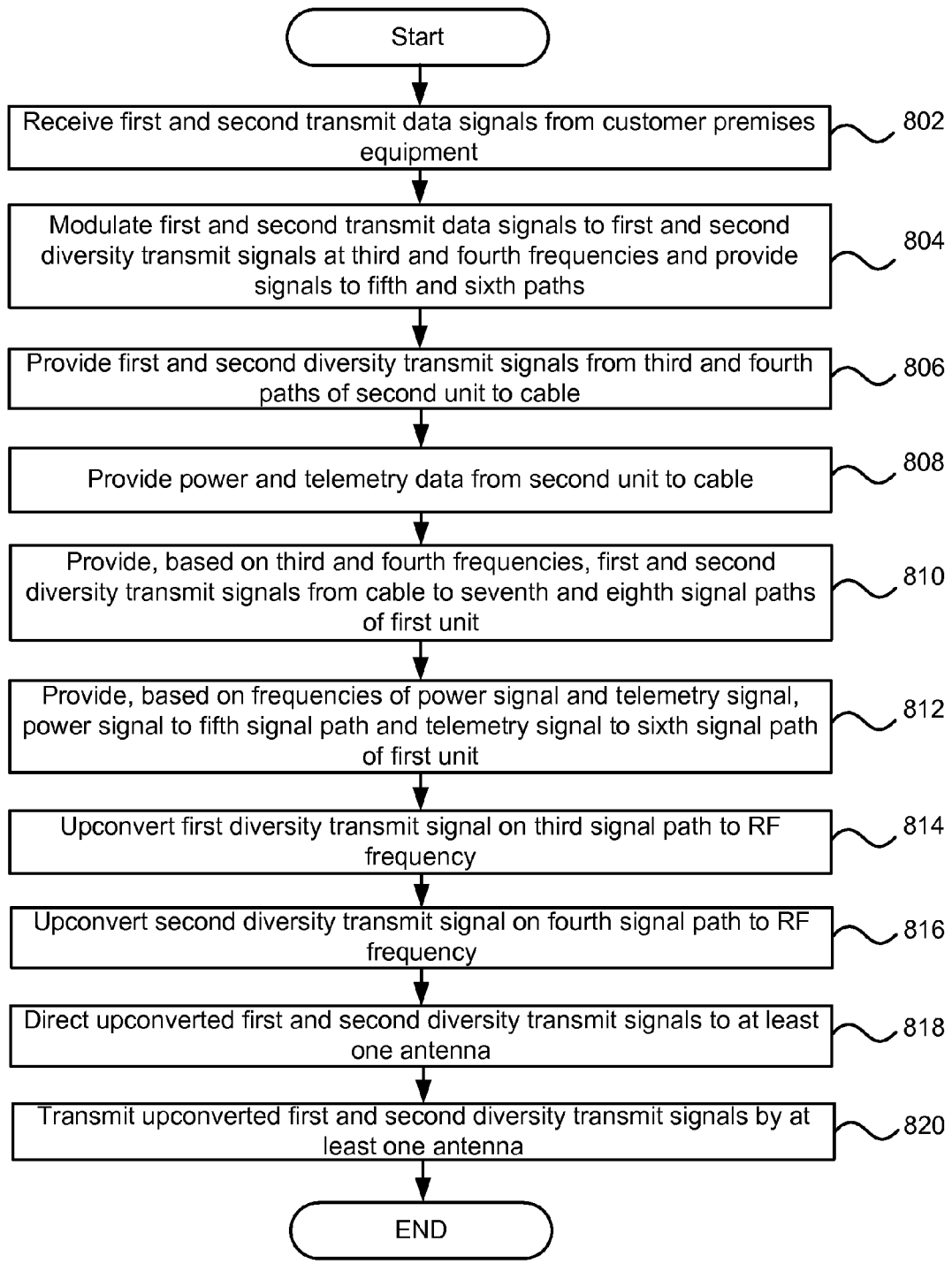
FIG. 8 is a flow diagram for transmitting two diversity transmit signals over a split mount system utilizing a single cable in some embodiments.

FIG. 8 is a flow diagram for transmitting two diversity transmit signals over a split mount system utilizing a single cable in some embodiments. In step 802, the IDU 600 receives first and second transmit data from customer premises equipment. Those skilled in the art will appreciate that any unit or modem may receive the first and second transmit data. In some embodiments, a single data signal from the customer premises equipment may be split into the first and second transmit data.

In step 804, the modem 608 modulates the first and second transmit data to first and second diversity transmit signals and provides the signals to first and second signal paths. In some embodiments, there may be four signal paths between the N-plexer 602 and the modem 603 which may allow for propagation of two receive signals and two transmit signals on different signal paths. The N-plexer 602 may be coupled to any number of signal paths including, for example, additional signal paths for power and/or telemetry.

In various embodiments, the modem 608 upconverts the frequencies of the two diversity transmit signals to two different IF frequencies. (e.g., a first transmit frequency may be upconverted to 311 MHz while the second transmit frequency may be upconverted to 700 MHz). For example, the modem 608 may adjust the frequency of the first and/or second transmit signals to make the frequencies different from one another and/or different from signals that may propagate on the cable 432.

In some embodiments, the IF-BB converter 610 upconverts the two diversity transmit signals to one IF frequency or two different IF frequencies.

In step 806, the N-plexer 602 provides first and second diversity transmit signals from the modem to the cable 432. In step 808, the N-plexer 602 also provides power and/or telemetry data from the second unit (e.g., IDU 600) to the cable 432.

In step 810, the N-plexer 430 of the ODU 400 may provide the first and second diversity transmit signals from the cable 432 to the seventh and eighth signal paths of the ODU 400. As discussed herein, the N-plexer 430 may route the signals based on their distinct frequencies.

In step 812, the N-plexer 430 may provide the power signal and telemetry signal to the fifth and sixth signal paths, respectively, of the ODU 400 based on the distinct frequencies of the power and telemetry signals.

In step 814, the transmitter 414 may upconvert the first diversity transmit signal from the fifth signal path to a transmit RF frequency. Similarly, in step 816, the transmitter 418 may upconvert the second diversity transmit signal from the sixth signal path to the RF frequency.

In step 818, the upconverted first and second diversity transmit signals are directed to at least one antenna. For example, the waveguide filters 408 may receive the first upconverted diversity transmit signal from the transmitter 414 and provide the signal to the OMT 406. Similarly, the waveguide filters 412 may receive the second upconverted diversity transmit signal from the transmitter 418 and provide the signal to the OMT 406. The OMT 406 may horizontally polarize the upconverted first transmit signal and vertically polarize the upconverted second transmit signal.

In step 820, the at least one antenna (e.g., antenna 402) may transmit the orthogonally polarized transmit signals.

Those skilled in the art will appreciate that the steps of FIG. 8 may be performed in any order. Further, any of the steps or any combination of steps may be performed simultaneously with other steps or other combination of steps.

The above-described functions may be performed in hardware. In one example, the functions may be performed by one or more field-programmable gate arrays (FPGAs), discrete hardware, and/or one or more application-specific integrated circuits (ASICs).

Further, one or more functions may be stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

The invention claimed is:

1. A system comprising:
at least one antenna configured to receive a first receive signal having a first signal diversity property and a second receive signal having a second signal diversity property;
a first signal path coupled to the at least one antenna, the first signal path including a first frequency converter configured to downconvert the first receive signal to a first intermediate frequency signal having a first intermediate frequency;
a second signal path coupled to the at least one antenna, the second signal path including a second frequency converter configured to downconvert the second receive signal to a second intermediate frequency signal having a second intermediate frequency;
a transducer module coupled to the at least one antenna, the first signal path, and the second signal path, the transducer module configured to route the first receive signal to the first signal path and route the second receive signal to the second signal path; and
a first N-plexer coupled to the first signal path and the second signal path, the first N-plexer configured to select the first intermediate frequency signal or the second intermediate frequency signal for transmission to a cable, and to provide a data signal based on the selected intermediate frequency signal to the cable.

2. The system of claim 1, wherein the first signal diversity property comprises a first spatial property, and the second signal diversity property comprises a second spatial property, the second spatial property being spatially diverse from the first spatial property.

3. The system of claim 1, wherein the first signal diversity property comprises a first polarization, and the second signal diversity property comprises a second polarization, the second polarization being orthogonal to the first polarization.

4. The system of claim 3, wherein the transducer module is further configured to depolarize the first receive signal and the second receive signal.

5. The system of claim 1, wherein the system is incorporated into an Outdoor Unit (ODU) of a split-mount radio system.

6. The system of claim 1, further comprising:
a second N-plexer coupled to the cable, the second N-plexer configured to receive the data signal from the cable, to provide the data signal to a third signal path if the selected intermediate signal is the first intermediate frequency signal, and to provide the data signal to a fourth signal path if the selected intermediate signal is the second intermediate frequency signal;
a modem coupled to the third signal path and the fourth signal path, the modem configured to demodulate the data signal and provide a demodulated data signal; and
a third frequency converter coupled to the modem, the third frequency converter configured to downconvert the demodulated data signal to a baseband signal.

7. The system of claim 6, wherein the second N-plexer, the modem, and the third frequency converter are within an Indoor Unit (IDU) of a split-mount radio system.

8. The system of claim 6, wherein the third frequency converter is further configured to provide the baseband signal to Customer Premises Equipment (CPE).

9. A system comprising:
a first N-plexer configured to be coupled to a cable, the first N-plexer configured to receive from the cable a first data signal and a second data signal, and to convert the first data signal to a first intermediate frequency signal, and to convert the second data signal to a second intermediate frequency signal;
a first signal path coupled to the N-plexer, the first signal path including a first frequency converter configured to upconvert the first intermediate frequency signal to a first transmit signal having a transmit frequency;
a second signal path coupled to the N-Plexer, the second signal path including a second frequency converter configured to upconvert the second intermediate frequency signal to a second transmit signal having the transmit frequency;
a transducer module coupled to the first signal path and the second signal path, the transducer module configured to process the first transmit signal and the second transmit signal; and
at least one antenna coupled to the transducer module, the at least one antenna configured to transmit the first transmit signal using a first signal diversity property, and to transmit the second transmit signal using a second signal diversity property.

10. The system of claim 9, wherein the first signal diversity property comprises a first spatial property, and the second signal diversity property comprises a second spatial property, the second spatial property being spatially diverse from the first spatial property.

11. The system of claim 9, wherein the first signal diversity property comprises a first polarization, and the second signal diversity property comprises a second polarization, the second polarization being orthogonal to the first polarization.

12. The system of claim 11, wherein the transducer module is further configured to polarize the first transmit signal and the second transmit signal.

13. The system of claim 9, wherein the system is incorporated into an Outdoor Unit (ODU) of a split-mount radio system.

14. A method comprising:
receiving a first receive signal having a first signal diversity property;
receiving a second receive signal having a second signal diversity property;
downconverting, in a first signal path, the first receive signal to a first intermediate frequency signal having a first intermediate frequency;
downconverting, in a second signal path, the second receive signal to a second intermediate frequency signal having a second intermediate frequency;
routing the first receive signal to the first signal path;
routing the second receive signal to the second signal path;
selecting the first intermediate frequency signal or the second intermediate frequency signal for transmission to a cable; and
providing a data signal based on the selected intermediate frequency signal to the cable.

15. The method of claim 14, wherein the first signal diversity property comprises a first spatial property, and the second signal diversity property comprises a second spatial property, the second spatial property being spatially diverse from the first spatial property.

16. The method of claim 14, wherein the first signal diversity property comprises a first polarization, and the second signal diversity property comprises a second polarization, the second polarization being orthogonal to the first polarization.

17. The method of claim 16, further comprising:
depolarizing the first receive signal; and
depolarizing the second receive signal.

18. The method of claim 14, further comprising:
providing the first intermediate frequency signal to a third signal path;
providing the second intermediate frequency signal to a fourth signal path;
demodulating the first intermediate frequency signal and the second intermediate frequency signal to provide a demodulated intermediate frequency signal; and
downconverting the demodulated intermediate frequency signal to a baseband signal.

19. The method of claim 18, further comprising providing the baseband signal to Customer Premises Equipment (CPE).

20. A method comprising:
receiving from a cable a first data signal;
receiving from the cable a second data signal;
converting the first data signal to a first intermediate frequency signal having a first intermediate frequency;
converting the second data signal to a second intermediate frequency signal having a second intermediate frequency;
upconverting, in a first signal path, the first intermediate frequency signal to a first transmit signal having a transmit frequency;

upconverting, in a second signal path, the second intermediate frequency signal to a second transmit signal having the transmit frequency;

using a transducer module coupled to the first signal path and the second signal path to process the first transmit signal;

using the transducer module to process the second transmit signal;

using at least one antenna to transmit the first transmit signal using a first signal diversity property; and using the at least one antenna to transmit the second transmit signal using a second signal diversity property.

21. The method of claim 20, wherein the first signal diversity property comprises a first spatial property, and the second signal diversity property comprises a second spatial property, the second spatial property being spatially diverse from the first spatial property.

22. The method of claim 20, wherein the first signal diversity property comprises a first polarization, and the second signal diversity property comprises a second polarization, the second polarization being orthogonal to the first polarization.

23. The method of claim 22, further comprising:
polarizing the first transmit signal; and
polarizing the second transmit signal.

\* \* \* \* \*